Patented Oct. 25, 1932

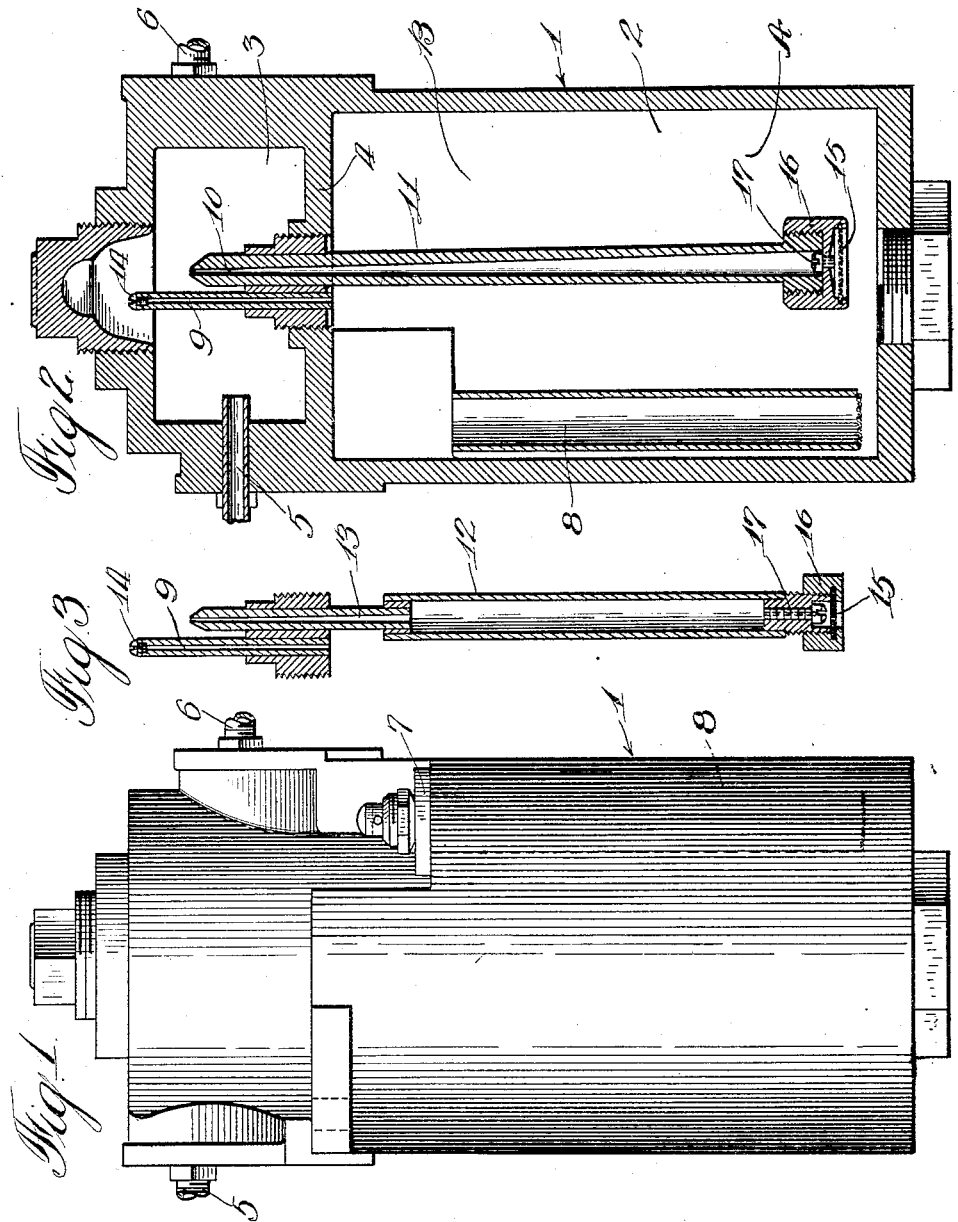

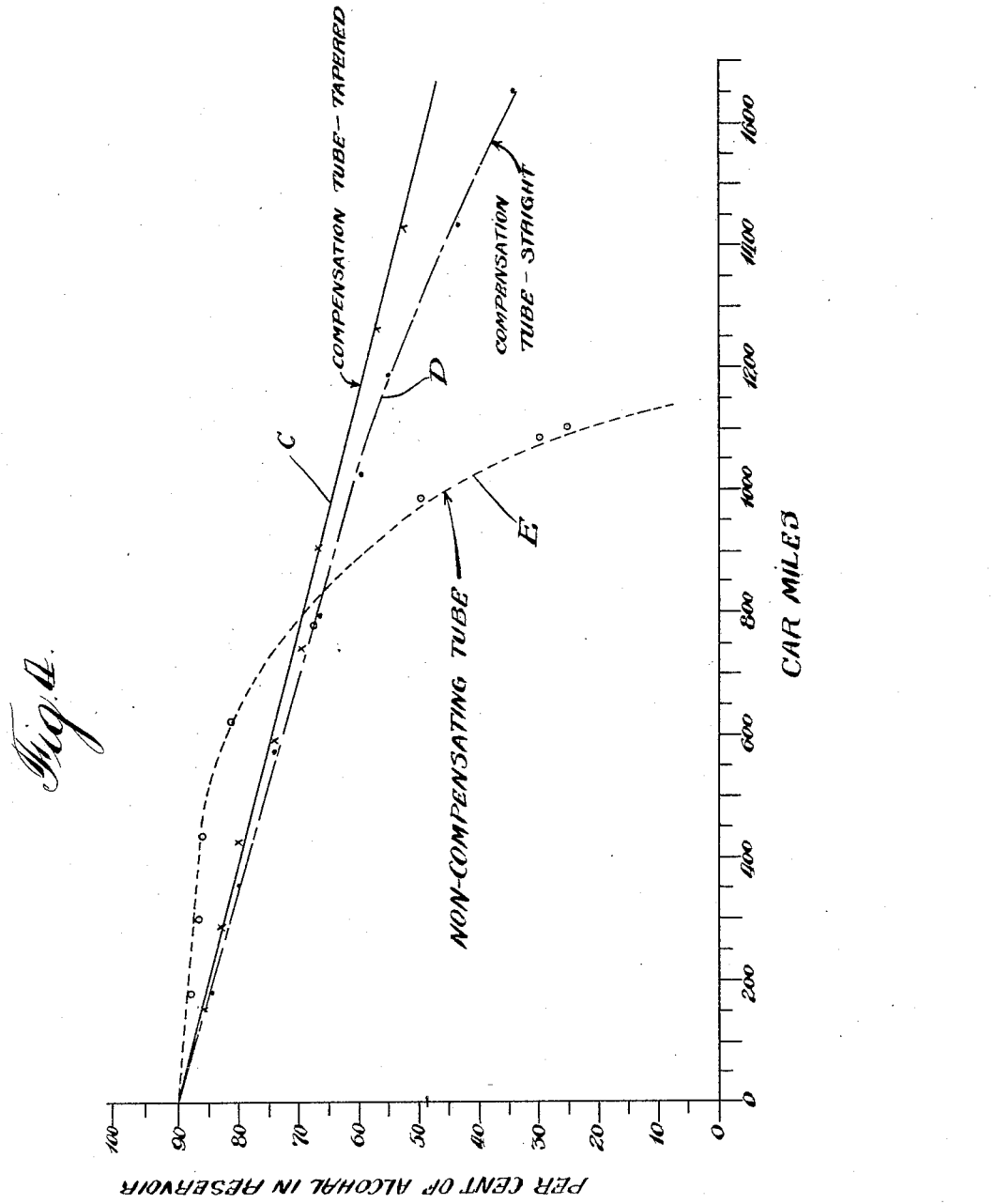

1,884,092

UNITED STATES PATENT OFFICE

FREDERICK S. MINIER, OF KANSAS CITY, MISSOURI, ASSIGNOR TO EDWARD W. ANGER, OF CHICAGO, ILLINOIS

LIQUID SUPPLY FOR COMPRESSED AIR SYSTEMS

Application filed February 25, 1929, Serial No. 342,523. Renewed February 8, 1932.

My invention relates to a liquid supply for a compressed air system.

Among the objects of the invention are to provide a device for supplying liquid to a variable pressure compressed air system in which the amount of the liquid supplied to the system will be substantially constant for a given reduction of pressure in the system regardless of the amount of liquid in the reservoir. In devices heretofore used the amount of liquid supplied to the system upon a given reduction of pressure varied greatly with the change in level of the liquid in the reservoir. In a certain type of device this was due to the fact that at the lower liquid levels a greater amount of air was contained in the liquid reservoir, and as the liquid flow would continue until the air pressure in the reservoir was lowered to substantially the reduced pressure in the system, it followed that the liquid flow would continue a materially longer time at the low liquid levels than at the high liquid levels. This resulted in an insufficient supply of the liquid when the liquid level in the reservoir was high and an excessive supply of liquid to the system when the liquid level in the reservoir was low. Thus, when the reservoir level was high the supply of liquid was insufficient and if used to prevent freezing of air pipes was ineffective for this purpose, and at low liquid levels the supply of liquid was excessive resulting in waste and disadvantages due to an oversupply of the liquid.

One of the purposes of this invention is to cure this defect of an oversupply under one condition and an under-supply during another condition.

In the drawings, in which two embodiments of my invention are shown;

Fig. 1 is an elevational view of my improved device;

Fig. 2 is an axial vertical section thereof;

Fig. 3 is a view showing a modified form of compensating tube; and

Fig. 4 is a chart showing the rate of discharge of the liquid using three different forms of apparatus.

Referring to the drawings in detail, the construction shown therein comprises a liquid reservoir 1 having a large chamber 2 for the liquid in the lower part thereof and a smaller chamber 3 above the lower chamber 2 and separated therefrom by a horizontal partition 4, which upper chamber 3 is in communication with a supply of compressed air through the opening 5, and in communication with a variable pressure compressed air system through the opening 6. A filling opening 7 and filling pipe 8 forming no part of the present invention are provided for supplying the liquid, which may be alcohol, to the liquid chamber 2.

There are two passages 9 and 10 affording communication between the liquid chamber 2 and the upper air chamber 3. One of these passages 9 is for air only, and its sole purpose is to assist in equalizing the air pressure between the air in the upper part of the liquid chamber and the air in the upper air chamber 3 when the air pressure in the variable pressure system is changed. The other passage 10 is primarily for the flow of liquid from the liquid chamber 2 into the upper air chamber 3 and thence into the variable pressure air system.

With this construction, if the pressure in the upper air chamber 3 is lowered (as, for example, by the application of brakes in a compressed air braking system), the pressure in the upper air chamber 3 will, of course, become less than the air pressure above the liquid in the liquid chamber 2. This results in a flow of air through the air passage 9 and ultimately in a flow of liquid through the liquid passage 10.

Of course, before any liquid begins to flow through the liquid passage, the air which is in the tube 11 above the liquid level must be forced out through this tube, thus resulting in a delayed action with respect to the liquid flow. This delayed action of the liquid flow is taken advantage of in my invention to enable a uniform amount of liquid to be discharged upon a given reduction of pressure in the system regardless of the liquid level in the chamber 2.

In explanation of this it is to be stated that it will necessarily take a considerably longer time for the air pressure to become equalized upon a given reduction of pressure in the system if the liquid level is low, for instance, as indicated at A, than if the liquid level is high, as indicated at B. This is for the reason that there is a considerably greater amount of air in the liquid chamber 2 when the liquid level is low than when it is high, and consequently it takes considerably longer for this greater amount of air to escape. If the liquid were allowed to begin to flow almost as soon as the air pressure is reduced, it would flow for a considerably longer time at the low liquid levels than at the high liquid levels, and consequently would supply too much liquid at the low levels and too little liquid at the high levels. However, as indicated above, by a proper delayed action of the liquid flow the amount discharged may be made substantially constant for all liquid levels. To accomplish this the delayed action is so designed that the delay will be considerably greater at the low liquid levels than at the high liquid levels.

I have found that the best results are obtained by making the bore of the liquid discharge tube 11 tapering upwardly, the amount of taper being such that the discharge will be equalized at all liquid levels. The amount of liquid discharge is variable depending mainly upon the actual duration of flow of the liquid and the difference in pressure between the air in the liquid chamber 2 and the air in the upper chamber 3. By giving the right dimensions to the passage 10 in the liquid tube 11, the amount of flow may be made constant at all liquid levels, since a change in the size of the passage varies the delayed action of the liquid flow and thus varies the actual time of the liquid flow.

In Fig. 3 is shown a somewhat different form of liquid supply tube 12 in which the tube 12 is of uniform bore, though, of course, considerably larger than the outlet passage 13. This form gives approximately a uniform discharge at all liquid levels since of course the actual time of liquid flow is delayed considerably more at low liquid levels than at high liquid levels, due to the greater amount of air which has to escape out of the upper end of the tube at low levels than at high levels before any liquid actually begins to flow.

In order to enable the rate of flow of air through the air tube to be varied, a removable plug 14 is provided at the upper end of the passage 9, having an aperture therethrough. By removing this plug and substituting one with an orifice of a different size, the rate of flow may be varied to give the desired duration of flow in equalizing the air pressure. In order to keep foreign material out of the liquid tube, a strainer 15 may be provided at the lower end of the tubes 11 and 12 mounted on a removable cap 16 threaded onto the lower end of the tube. In order to enable the rate of flow of the liquid to be adjusted, a removable plug 17 may be provided, this plug having an opening therethrough for the passage of the liquid. By removing this plug and substituting one having an opening of a different size, the rate of liquid flow may be varied as desired.

In Fig. 4 are shown three curves showing the rate of discharge of liquid at various liquid levels, the curve C showing the rate of discharge, using a properly designed tapered bore compensation tube such as shown in Fig. 2, the curve D showing the rate of discharge at various liquid levels, using a compensation tube of the type shown in Fig. 3, and the curve E showing the rate of discharge at various liquid levels using a non-compensating tube of a type prior to applicant's invention. These curves are from tests made in actual use. The vertical axis shows percentages of liquid in the liquid reservoir, and the horizontal axis shows car miles. With the tapered bore compensation tube, it will be seen that the amount discharged per car mile is substantially uniform at all liquid levels. With the straight bore compensation tube the rate of discharge per car mile is approximately constant, although not quite so satisfactory as when the tapered bore compensation tube is used. With the non-compensating tube, the rate of discharge is very slow at first and very rapid at last. This curve shows that for the first 500 car miles using the non-compensating tube, less than five percent of the alcohol in the reservoir is supplied to the system. During the last 500 miles, almost 80% of the liquid in the reservoir is supplied to the system. This curve gives an entirely inadequate supply when the reservoir is full, and a very excessive oversupply when the liquid level is low. If the liquid is used to prevent frost in the compressed air system, the supply is likely to be insufficient at the high liquid levels and the system is of course wasteful of liquid at the low levels.

The compensating tube, when equipped with the proper sized orifices and installed in the device, will deliver a constant quantity of alcohol to the air brake system of a car regardless of the changes in the level of alcohol. The quantity of alcohol delivered can be adjusted to meet any set of requirements but for each brake application the quantity will be the same.

Better protection from freezing will be given to the air brake system, since for approximately the first 600 miles of operation after filling, more alcohol is delivered to the system with the compensating tube than with the standard tube.

Approximately two-thirds of the quantity of alcohol used by the standard tube will be saved by the installation of the compensating tube. This saving results from the fact that after approximately 600 miles of operation the feed of alcohol increases with the standard tube and an excess of alcohol is delivered beyond what is needed to prevent freezing of the moisture in the pipes and valves of the air brake system.

While I have shown but two embodiments of my invention, it is obvious that it may be embodied in other forms covered and defined by the appended claims.

I claim:

1. A device for supplying liquid to a changeable pressure compressed air system comprising a variable level reservoir for a liquid, and two passages leading from said reservoir to said system, one leading from above the liquid level whereby air is caused to flow from said reservoir into said system upon a reduction of pressure in the system, and one leading from below the liquid level whereby liquid is caused to flow into the system upon a reduction of pressure in the system, said device having provisions whereby substantially the same amount of liquid will be supplied to the system upon any definite reduction of the pressure regardless of the liquid level in the reservoir, said provisions comprising a chamber in said liquid passage, the air capacity of which materially increases as the liquid level lowers whereby at the lower levels a greater amount of air must flow into the system through the liquid passage before the liquid itself begins to flow into the system, thus compensating for the greater length of time it takes to equalize the air pressure at the lower levels, said chamber tapering upwardly whereby the compensation may be exactly graduated to correspond to the liquid level.

2. A device for supplying liquid to a changeable pressure compressed air system comprising a variable level reservoir for a liquid, and two passages leading from said reservoir to said system, one leading from above the liquid level whereby air is caused to flow from said reservoir into said system upon a reduction of pressure in the system, and one leading from below the liquid level whereby liquid is caused to flow into the system upon a reduction of pressure in the system, said device having provisions whereby substantially the same amount of liquid will be supplied to the system upon any definite reduction of the pressure regardless of the liquid level in the reservoir, said provisions comprising a chamber in said liquid passage, the air capacity of which materially increases as the liquid level lowers whereby at the lower levels a greater amount of air must flow into the system through the liquid passage before the liquid itself begins to flow into the system, said chamber being provided with a restricted constantly open port controlling the escape of air from the chamber having an effective cross-sectional area materially less than the average cross-sectional area of said chamber, thus proportionately delaying the beginning of the liquid flow and compensating for the greater length of time it takes to equalize the air pressure at the lower levels.

In witness whereof, I have hereunto subscribed my name.

FREDERICK S. MINIER.